(12) United States Patent
Cheng

(10) Patent No.: US 6,856,347 B1
(45) Date of Patent: Feb. 15, 2005

(54) PHOTIC IMAGE PROCESSING METHOD

(75) Inventor: Peen-Pau Cheng, Hsinchu (TW)

(73) Assignee: Mustek Systems, Inc., Hsinchu (TW)

( * ) Notice: Subject to any disclaimer, the term of this patent is extended or adjusted under 35 U.S.C. 154(b) by 0 days.

(21) Appl. No.: 09/499,949

(22) Filed: Feb. 8, 2000

Related U.S. Application Data

(63) Continuation-in-part of application No. 08/739,179, filed on Oct. 30, 1996, now Pat. No. 6,052,147.

(51) Int. Cl.[7] .......................... H04N 5/235; H04N 5/228
(52) U.S. Cl. .................................. 348/229.1; 348/222.1
(58) Field of Search .......................... 348/229.1, 223.1, 348/222.1, 220.1, 230.1, 231.99, 231.6, 241, 257, 371, 372, 272; 330/279, 278, 282, 284

(56) References Cited

U.S. PATENT DOCUMENTS

| | | | |
|---|---|---|---|
| 4,959,727 A | | 9/1990 | Imaide et al. |
| 5,166,811 A | | 11/1992 | Nagano |
| 5,329,312 A | | 7/1994 | Boisvert et al. |
| 5,438,367 A | * | 8/1995 | Yamamoto et al. ......... 348/371 |
| 5,457,494 A | | 10/1995 | Suga et al. |
| 5,504,525 A | | 4/1996 | Suzuki |
| 5,554,975 A | | 9/1996 | Hall et al. |
| 5,579,049 A | * | 11/1996 | Shimaya et al. ......... 348/229.1 |
| 5,625,412 A | | 4/1997 | Aciu et al. |
| 5,736,886 A | | 4/1998 | Mangelsdorf et al. |
| 5,781,233 A | * | 7/1998 | Liang et al. ............. 348/229.1 |
| 6,052,147 A | * | 4/2000 | Cheng ..................... 348/229.1 |

* cited by examiner

Primary Examiner—Wendy R. Garber
Assistant Examiner—Luong T Nguyen
(74) Attorney, Agent, or Firm—Knobbe, Martens, Olson & Bear, LLP

(57) ABSTRACT

The present invention relates to a photic image processing method which includes steps of (1) processing a photic image unit to generate a photic image signal having a plurality of basic image signals, (2) performing a first regulating compensation to each of the basic image signals of the photic image to generate a first compensated basic image signals in order to equilibrate the basic image signals of the photic image signal, (3) multiplexing the first compensated basic image signals in a period of time to generate a multiplexed photic image signal having the compensated basic image signals in series in the period of time, wherein the period is equal to a time of processing a photic image unit, and (4) performing a second regulating compensation for the multiplexed photic image signal to generate a second compensated multiplexed photic image signal. The photic image processing method disclosed in this disclosure is capable of producing a photic image having high resolution and quality.

5 Claims, 2 Drawing Sheets

PHOTIC IMAGE PROCESSING METHOD

The present invention is a CIP application of the parent application "Photic Image Processing Device" bearing the Ser. No. 08/739,179 and filed on Oct. 30, 1996, now U.S. Pat. No. 6,052,147.

FIELD OF THE INVENTION

The present invention relates to a photic image processing method that can produce a photic image having high resolution and quality.

BACKGROUND OF THE INVENTION

In general, a photic image processing device at least includes three portions:
(1) a photic image pick-up component;
(2) a photic image processing component; and
(3) an electric power supplier and a motor driver.

As in the prior art, a programmable gain amplifier (PGA) disposed in the photic image processing component is employed for compensating a non-uniformity appearing among a lamp's brightness, a charge coupled device (CCD) and a lens.

However, the shortcoming of this compensation by utilizing a PGA is that, only one single color of the processed photic image is compensated at a time. Hence, if plural colors are required for processing, accordingly, plural PGAs are demanded. Consequently, the cost is increased and the electric circuit thereof is therefore becoming more complicated.

Besides, as disclosed in the prior art, plural exposure periods are utilized for compensating, however, each exposure period can merely process only one single co or correspondingly. Hence, the processing time required for processing the photic image is accordingly increased.

In addition, when plural PGAs are employed for compensating the photic image, plural analog/digital amplifying devices are correspondingly required. Furthermore, owing to the high price of the analog/digital amplifying device, therefore, total cost of the photic image processing device is enormously increased.

SUMMARY OF THE INVENTION

The major object of the present invention is to provide a photic image processing method which is capable of processing a photic image in a manner of high quality and high resolution.

The photic image processing method of the present invention includes steps of (1) processing a photic image unit to generate a photic image signal having a plurality of basic image signals each of which represents a fundamental color, (2) performing a first regulating compensation to each of the basic image signals of the photic image to generate first compensated basic image signals, (3) multiplexing the first compensated basic image signals in a period of time to generate a multiplexed photic image signal having the compensated basic image signals in series in the period of time, wherein the period is equal to a time of processing a photic image unit, and (4) performing a second regulating compensation for the multiplexed photic image signal to generate a second compensated multiplexed photic image signal.

According to the present invention, the step (1) further includes steps of (1a) generating a light signal to an object for obtaining a reflective signal and (1b) executing a photoelectric conversion in response to the reflective signal for obtaining the photic image signal having the plurality of basic image signals.

In accordance with the present invention, the step (1) further includes a step of (1c) executing a current amplification for the photic image signal in order to enhance an anti-disturbance ability of the photic image signal.

According to the present invention, the step (2) further includes steps of (2a) eliminating a common-mode voltage of the photic image signal; (2b) regulating a DC voltage offset of the photic image signal; (2c) amplifying and outputting the photic image signal whose the DC voltage offset is regulated; and (2d) performing the first regulating compensation in response to a control signal, in order to equilibrate the basic image signals of the photic image signal.

In accordance with the present invention, the basic image signals of the photic image signal are respectively 3 basic signals indicative of red, green and blue fundamental colors, and the step (1) is executed by a is photic image pick-up circuit including a lamp having a brightness, a lens and charge coupled device (CCD).

According to the present invention, the first regulating compensation regulates and equilibrates the photic image signals of red, green and blue fundamental colors and compensates a lamp aging phenomenon of the photic image pick-up circuit. In addition, the second regulating compensation correlates and compensates a non-uniformity among the lamp's brightness, the lens, and the charge coupled device (CCD).

In accordance with the present invention, the step (3) further includes steps of (3a) equally dividing the period of time into three segments, and multiplexing the 3 basic signals of red, green and blue fundamental colors in the three segments to obtain a multiplexed photic image signal alternately containing therein the 3 basic signals, (3b) outputting three compensation values at the three segments, each of the three compensation values compensating one of the 3 basic signals of red, green and blue fundamental colors at the corresponding segment in the multiplexed photic image signal, and (3c) compensating the 3 basic signals of red, green and blue fundamental colors in the multiplexed photic image signal by multiplying respectively the three compensation values therefor to accomplish the second regulating compensation.

According to the present invention, the method further includes steps of (5) converting the second compensated multiplexed photic image signal into a digital photic image signal, and (6) generating the control signal corresponding to the digital photic image signal.

The present invention may best be understood through the following description with reference to the accompanying drawings, in which:

DETAILED DESCRIPTION OF THE PREFERRED EMBODIMENT

Figure 1:
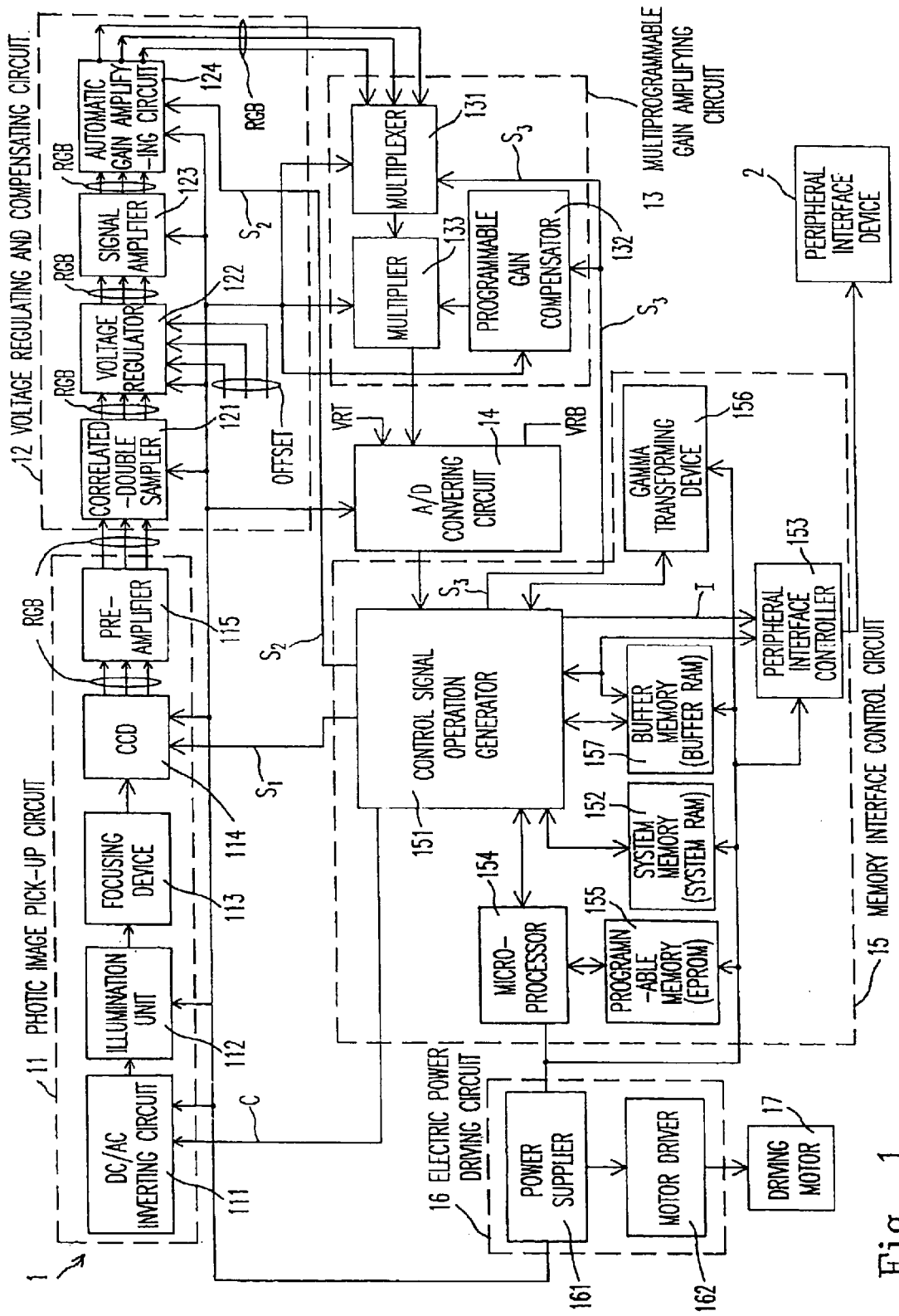
FIG. 1 is a system block diagram showing a preferred embodiment of an operation process according to the present invention.

Please refer to FIG. 1, which is a system block diagram showing a preferred embodiment of an operation process according to the present invention showing a photic image processing device 1 and a peripheral interface device 2. The photic image processing device 1 includes: a photic image pick-up circuit 11, a voltage regulating and compensating circuit 12, a multiprogrammable gain amplifying circuit 13, an analog/digital converting circuit 14, a memory interface control circuit 15, an electric power driving circuit 16 and a driving motor 17.

The photic image picking up circuit 11 further includes: a DC/AC voltage inverting circuit 111, an illumination unit 112 (preferably a lamp), a focusing device 113 (preferably a mirror and a lens), a charge coupled device (CCD) 114 and a preamplifiying device 115.

The voltage regulating and compensating circuit 12 includes: a correlated-double sampler 121, a voltage regulator 122, a signal amplifier 123 and an automatic gain controller 124. The multiprogrammable gain amplifying circuit 13 includes: a multiplexer 131, a programmable gain compensator 132 and a multiplier 133.

The memory interface control circuit 15 includes: a control signal operation generator 151, a system memory (system RAM) 152, a peripheral interface controller 153, a microprocessor 154, a programmable memory (EPROM) 155, a Gamma transforming device 156 and a buffer memory (buffer RAM) 157. While the electric power driving circuit 16 includes: a power supplier 161 and a motor driver 162.

The operation process of the photic image processing device according to the present invention is described as follows:

At first, the DC/AC voltage inverting circuit 111 inverts a DC voltage signal into an AC voltage signal having a high frequency and a relatively higher voltage according to an ON/OFF control signal generated and outputted from the control signal operation generator 151, in order to control the illumination unit 112, and accordingly the illumination unit 112 is able to generate and project a light signal on an object, e.g. text or picture (not shown in FIG. 1) in response to the AC voltage signal, consequently, a reflective signal generated by the reflection of the text and/or the pictures, is further reflected to the focusing device 113, and therefore the focusing device 113 focuses and reflects the reflective signal thereon to the charge coupled device 114 for performing a photoelectric converting operation therefor in order to output a photic image input signal.

Wherein, the charge coupled device (CCD) generates a photic image input signal including the photic image signals of red, green and blue fundamental colors by employing a converting means of phase vs. voltage, in response respectively to a first control signal S1 generated by the control signal operation generator 151 and the focused reflective signal reflected from the focusing device 113. Thereafter, the photic image input signal is transmitted to the preamplifying device 115 from the charge coupled device 114, and the photic image input signal is processed by utilizing a current amplification in order to enhance an anti-disturbance ability of the photic image input signal. However, if the object irradiated by the illumination unit 112 is a transparent object, then merely a relevant equipment for handling the same is needed to equip the object for processing.

Moreover, the correlated-double sampler (CDS) 121 electrically connected to the preamplifying device 115, is used to reduce a common-mode voltage of the photic image input signal, thereafter, the DC voltage offset of the photic image input signal is eliminated by the voltage regulator 122 in which an adder can be included before amplified via the signal amplifier 123; wherein a differential value signal indicated by OFFSET in FIG. 1 cooperates with the voltage regulator 122 during the processing for regulating the DC offset of the photic image input signal.

An automatic gain controller 124 electrically connected to the signal amplifier 123 is used to regulate the equilibrium among the red (R), green (G) and blue (B) fundamental colors of the photic image input signal in response to a control second signal S2 generated and outputted from the control signal operation generator 151, in order to compensate the photic image aliasing caused by the aging phenomenon of the lamp 112.

Please now refer to the multiprogrammable gain amplifying circuit 13, in which the multiplexer 131 electrically connected to the voltage regulating and compensating circuit 12 is used to input the photic image input signal and divide a period of processing a specific photic image unit into three segments in response to a third control signal S3 generated and outputted from the control signal operation generator 151. The period of processing a specific photic image unit is the period for CCD 114 processing a pixel. The multiplexer 131 equally dividing the period of processing a specific photic image unit into three segments, and multiplexing the 3 series of the photic image signals of red, green and blue fundamental colors in each segment of the period to obtain a photic image output signal alternately containing therein the 3 series of photic image signals in order to compensate and correlate a non-uniformity among the brightness of the lamp 112, the lens 113 and the CCD 114. Furthermore, the programmable gain compensator 132 is able to output the compensation values respectively for the R, G and B fundamental colors during each of the three segments of the period for processing the photic image unit in accordance with the third control signal S3. Accordingly, the fundamental colors of R, G and B are respectively compensated by the compensation values and mixed up one another before outputted by a manner of in a series of photic image signals. Therefore, the compensated fundamental colors of R× G and B respectively outputted from these three segments are transmitted to the multiplier 133 and multiplied respectively to each other.

Thereafter, the outputted series of photic image signals are transmitted to the analog/digital converting circuit 14, accordingly the series of photic image signals are converted into a digital photic image signal therein in response to a VRT and a VBR signals.

The control signal operation generator 151 generates and outputs the first, second and third control signals S1, S2 and S3 according to the inputted digital photic image signal outputted from the analog/digital converting circuit 14, and the first, second and third control signals S1, S2 and S3 are utilized to execute an operation for generating a photic image output signal. The system memory 152 is used to record and store a correlating curve for the R, G and B fundamental colors. As to the peripheral interface controller 153, e.g. a SCSI peripheral interface controller, it is used to output the photic image output signal to a specified peripheral interface device 2, e.g. a personal computer, in response to a peripheral interface control signal I generated from the control signal operation generator 151. The microprocessor 154 is used to control a process operated in the photic image processing device 1 beginning from picking up a photic image and ending with outputting the photic image output signal via the peripheral interface controller 153. Moreover, the programmable memory 155 is employed to provide a required signal information for the microprocessor 154 during operation. The Gamma transforming device having a Gamma transforming table is used to perform a Gamma transformation in order that the user can define a color of a photic image by himself for achieving a demanded color. The buffer memory 157 provides the Gamma transforming device 156 with a storing function for storing a photic image information during the execution of the Gamma transformation, and outputs the photic image information outputted from the peripheral interface controller 153 to a specified peripheral interface device 2.

The power supplier 161, e.g. a switch type power supplier is used to provide a power source signal for the photic image device 1, and the motor driver 162 is utilized to drive the driving motor 17. Of course, if the power supplier 161 is able to be combined with the motor driver 162 into a single unit, the power loss induced by the circuit impedance will be accordingly reduced.

Figure 2:
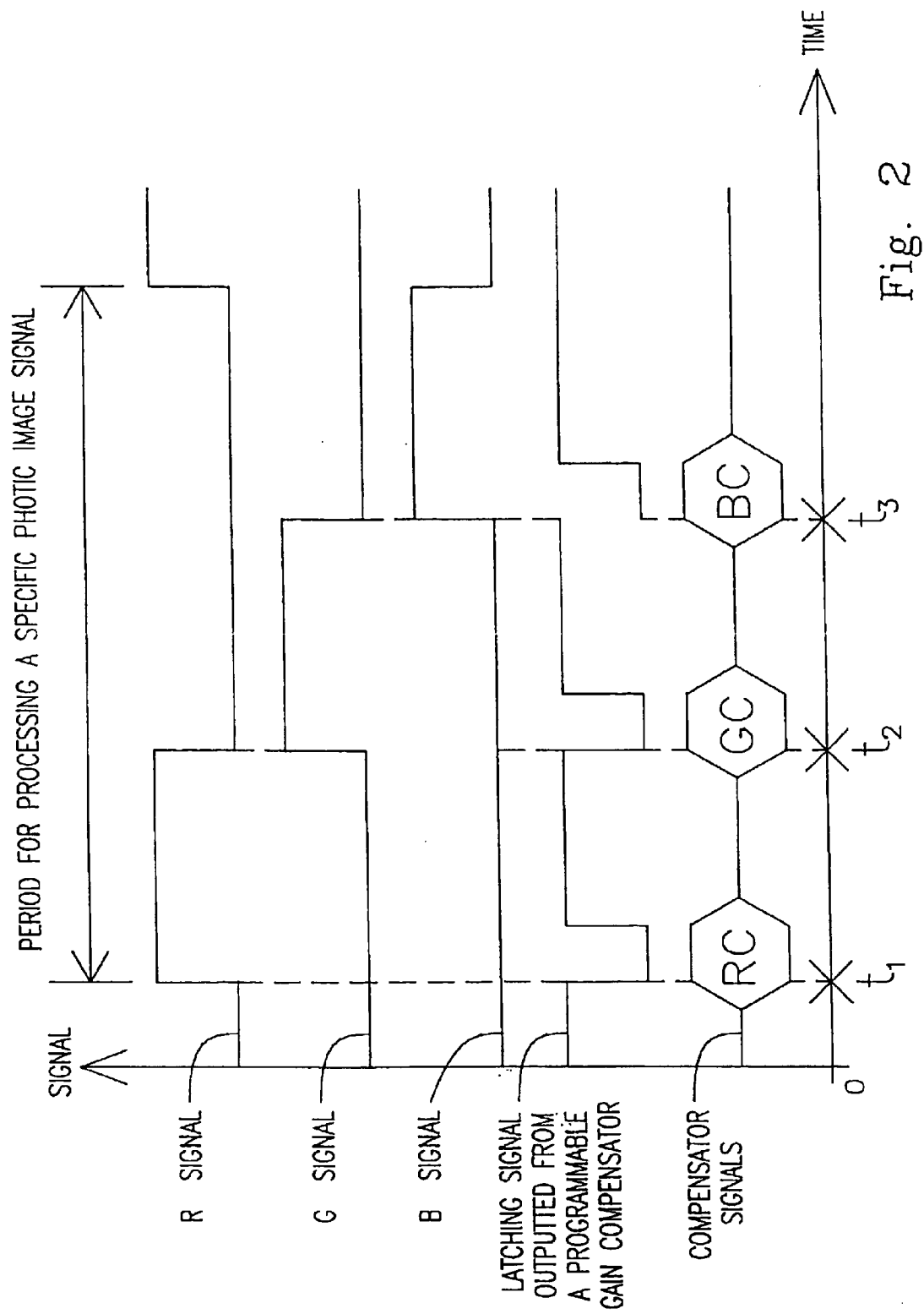
FIG. 2 is a time sequence diagram showing a preferred embodiment of an operation for processing and compensating the R, G and B fundamental colors of a photic image signal during a period of processing a specific photic image unit according to the present invention.

In order to further realize the compensating process for the R, G and B fundamental colors executed by the programmable gain compensator 132 of the multiprogrammable gain compensator 13, please refer to FIGS. 1 & 2. FIG. 2 is a time sequence diagram showing a preferred embodiment of an operation for processing and compensating the R, G and B fundamental colors in a period of processing a specific photic image unit according to the present invention. In FIG. 2, the multiplexer 131 outputting the R, G and B fundamental colors respectively in three distinct time segments of the period of processing the specific photic image unit by the multiswitching control in response to the third control signal S3. Accordingly, the programmable gain compensator 132 outputs respectively the latching signals and the compensation values RC, GC and BC for the R, G and B fundamental colors at the different time t1, t2 and t3 during compensation.

To sum up, the present invention merely needs a multiplexer 131, a control signal operation generator 151 for controlling the multiplexer 131 and an analog/digital converting circuit 14, to accomplish the same function obtained by utilizing plural multiplexers and plural analog/digital converting circuits as disclosed in the prior art. Hence, the circuit configuration disclosed in the present invention is capable of obtaining a photic image signal having a high resolution and quality but preventing from an evidently cost increment. Therefore, the present invention is a valuable industrial application.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A photic image processing method executed by a photic image pick-up circuit including a lamp having a brightness, a lens and charge coupled device (CCD), comprising steps of:
   (1) processing a photic image unit to generate a photic image signal having a plurality of basic image signals each of which represents a fundamental color, wherein said basic image signals of said photic image signal are respectively 3 basic signals indicative of red, green and blue fundamental colors;
   (2) performing a first regulating compensation to each of said basic image signals of said photic image to generate first compensated basic image signals, wherein said first regulating compensation regulates and equilibrates said photic image signals of red, green and blue fundamental colors and compensates a lamp aging phenomenon of said photic image pick-up circuit;
   (2a) eliminating a common-mode voltage of said photic image signal;
   (2b) regulating a DC voltage offset of said photic image signal;
   (2c) amplifying and outputting said photic image signal whose said DC voltage offset is regulated;
   (2d) performing said first regulating compensation in response to a control signal, in order to equilibrate said basic image signals of said photic image signal;
   (3) multiplexing said first compensated basic image signals in a period of time to generate a multiplexed photic image signal having said compensated basic image signals in series in said period of time, wherein said period is equal to a time of processing a photic image unit; and
   (4) performing a second regulating compensation for said multiplexed photic image signal to generate a second compensated multiplexed photic image signal.

2. A photic image processing method as claimed in claim 1, wherein said step (3) further includes steps of:
   (3a) equally dividing said period of time into three segments, and multiplexing said 3 basic signals of red, green and blue fundamental colors in said three segments to obtain a multiplexed photic image signal alternately containing therein said 3 basic signals;
   (3b) outputting three compensation values at said three segments, each of said three compensation values compensating one of said 3 basic signals of red, green and blue fundamental colors at the corresponding segment in said multiplexed photic image signal; and
   (3c) compensating said 3 basic signals of red, green and blue fundamental colors in said multiplexed photic image signal by multiplying respectively said three compensation values therefor to accomplish said second regulating compensation.

3. A photic image processing device as claimed in claim 1, wherein said second regulating compensation correlates and compensates a non-uniformity among said lamp's brightness, said lens, and said charge coupled device (CCD).

4. A photic image processing method according to claim 2, wherein said method further includes steps of:
   (1) converting said second compensated multiplexed photic image signal into a digital photic image signal; and
   (2) generating said control signal corresponding to said digital photic image signal.

5. A photic image processing method, comprising steps of:
   (1) processing a photic image unit to generate a photic image signal having a plurality of basic image signals;
   (2) performing a first regulating compensation to each of said basic image signals of said photic image to generate a first compensated basic image signals in order to equilibrate said basic image signals of said photic image signal;
   (3) multiplexing said first compensated basic image signals in a period of time to generate a multiplexed photic image signal having said compensated basic image signals in series in said period of time, wherein said period is equal to a time of processing a photic image unit;

(3a) equally dividing said period of time into three segments, and multiplexing said 3 basic signals of red, green and blue fundamental colors in said three segments to obtain a multiplexed photic image signal alternately containing therein said 3 basic signals;

(3b) outputting three compensation values at said three segments, each of said three compensation values compensating one of said 3 basic signals of red, green and blue fundamental colors at the corresponding segment in said multiplexed photic image signal;

(3c) compensating said 3 basic signals of red, green and blue fundamental colors in said multiplexed photic image signal by multiplying respectively said three compensation values therefor to accomplish said second regulating compensation; and (4) performing a second regulating compensation for said multiplexed photic image signal to generate a second compensated multiplexed photic image signal;

wherein said basic image signals of said photic image signal are respectively 3 basic signals indicative of red, green and blue fundamental colors, where is executed by a photic image picking up circuit including a lamp having a brightness, a lens and charge coupled device (CCD), and wherein said first regulating compensation regulates and equilibrates said photic image signals of red, green and blue fundamental colors and compensates a lamp aping phenomenon of said photic image pick-up circuit.

* * * * *

UNITED STATES PATENT AND TRADEMARK OFFICE
CERTIFICATE OF CORRECTION

PATENT NO. : 6,856,347 B1 Page 1 of 1
APPLICATION NO. : 09/499949
DATED : February 15, 2005
INVENTOR(S) : Peen-Pau Cheng It is certified that error appears in the above-identified patent and that said Letters Patent is hereby corrected as shown below:

In Claim 5, Column 8, Line 7, please delete "picking up" and insert --pick up--;

In Claim 5, Column 8, Line 11, please delete "aping" and insert --aging--;

Signed and Sealed this

Eighth Day of January, 2008

JON W. DUDAS
*Director of the United States Patent and Trademark Office*